United States Patent
Castrapel et al.

(10) Patent No.: US 7,209,939 B2
(45) Date of Patent: Apr. 24, 2007

(54) PRECISION IMPROVEMENT METHOD FOR THE STRASSEN/WINOGRAD MATRIX MULTIPLICATION METHOD

(75) Inventors: Rick R. Castrapel, Valley Center, CA (US); John L. Gustafson, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 640 days.

(21) Appl. No.: 10/364,617

(22) Filed: Feb. 10, 2003

(65) Prior Publication Data

US 2004/0010533 A1    Jan. 15, 2004

Related U.S. Application Data

(60) Provisional application No. 60/395,020, filed on Jul. 11, 2002.

(51) Int. Cl.
*G06F 7/52* (2006.01)

(52) U.S. Cl. .................................................. 708/607

(58) Field of Classification Search ................. 708/607
See application file for complete search history.

(56) References Cited

U.S. PATENT DOCUMENTS 5,099,447 A * 3/1992 Myszewski ................. 708/607
5,905,666 A * 5/1999 Hoffman et al. ............. 700/99
6,901,422 B1 * 5/2005 Sazegari ..................... 708/607

OTHER PUBLICATIONS

Bailey, D.H., "Extra High-Speed Matrix Multiplication on the Cray-2," SIAM J. Sci. Stat. Comp., (1988) 9: 603-607 (5 pgs.).
Douglas, C., et al., "GEMMW: A Portable Level 3 BLAS Winograd Variant of Strassen's Matrix-Matrix Multiply Algorithm," J. Comp. Phys., (1994) 110: 1-10 (10 pgs.).
Dumitrescu, B., "Improving and Estimating the Accuracy of Strassen's Algorithm," Numer. Math. (1998) 79: 485-499 (15 pgs.).
Higham, N.J., "Accuracy and Stability of Numerical Algorithms," Chapter 22, SIAM, Philadelphia, 1996; 446-463 (18 pgs.).
Huss-Lederman, S., et al., "Implementation of Strassen's Algorithm for Matrix Multiplication," In Proceedings of Supercomputing '96, 1996, (30 pgs.).

(Continued)

*Primary Examiner*—Chuong D. Ngo
(74) *Attorney, Agent, or Firm*—Osha Liang LLP

(57) ABSTRACT

A computer system for multiplying a first matrix and a second matrix that reduces rounding error, including a processor, a memory, a storage device, and software instructions stored in the memory for enabling the computer system, under the control of the processor, to perform obtaining a first set of dimension values for the first matrix and a second set of dimension values for the second matrix, selecting one of a plurality of multiplication permutations if the first set of dimension values and the second set of dimension values are greater than a crossover value, multiplying the first matrix by the second matrix using the multiplication permutation and a Strassen-Winograd method, recursively sub-dividing the first matrix and the second matrix producing a set of sub-matrix products and a recursion tree, and propagating the set of sub-matrix products up the recursion tree to produce a product matrix.

11 Claims, 4 Drawing Sheets

OTHER PUBLICATIONS

Strassen, V., "Gaussian Elimination is Not Optimal," Numer. Math., (1969) 13: 354-356 (3 pgs.).

Luo, Q., et al., "A Scalable Parallel Strassen's Matrix Multiplication Algorithm for Distributed-Memory Computers," ACM ISBN 0-89791-658-1 (1995), 221-226 (6 pgs).

Paprzycki, M., et al.; "Using Strassen's Matrix Multiplication in High Performance Solution of Linear Systems," Computers Math. Applic. Vo. 31, No. 4/5, 55-61 (7 pgs.) 1996.

Winograd, S., "On Multiplication of 2×2 Matrices," Linear Algebra and Its Applications 4 (1971), 381-388 (8 pgs.).

Kumar, B., et al., "A Tensor Product Formulation of Strassen's Matrix Multiplication Algorithm," 7th Int'l Symposium on Par. Proc. 1993, (25 pgs.).

Luoma, S.L., et al., "Improving Strassen's Algorithm for Matrix Multiplication: A Computer Architecture Approach," Dept. of Computer Science, Duke University, 1996; http://web.archive.org/web/19970803192751/http://www.cs.duke.edu/~luoma/strass/strass.html (23 pgs.).

Thottethodi, M., et al., "Tuning Strassen's Matrix Multiplication for Memory Efficiency," Dept. of Computer Science Publication, Duke University (undated), 1-16 (16 pgs.), 1998.

* cited by examiner

PRECISION IMPROVEMENT METHOD FOR THE STRASSEN/WINOGRAD MATRIX MULTIPLICATION METHOD

CROSS-REFERENCE TO RELATED APPLICATIONS

This application claims benefit of U.S. Provisional Application No. 60/395,020, entitled "Precision Improvement Method For the Strassen/Winograd Matrix Multiplication Method," filed Jul. 11, 2002.

BACKGROUND OF INVENTION

A matrix is a rectangular array of numeric or algebraic quantities subject to mathematical operations, e.g., multiplication, addition, subtraction, etc. Matrices are typically used to solve systems of equations where there are multiple variables to be computed. A matrix is especially useful in processing large quantities of numbers and unknowns, which can otherwise be difficult by individual computation. For example, matrices may be used to determine the vibrational resonance of a car engine, evaluate the electronic structure of a molecule, model heat transfer within a closed system, aid in rotation and translation of computer graphics, etc. The applications listed above are typically carried out on supercomputers.

$$[A][B]=[C] \tag{1a}$$

$$\begin{bmatrix} a_{11} & a_{12} \\ a_{21} & a_{22} \end{bmatrix} \begin{bmatrix} b_{11} & b_{12} \\ b_{21} & b_{22} \end{bmatrix} = \begin{bmatrix} c_{11} & c_{12} \\ c_{21} & c_{22} \end{bmatrix} \tag{1b}$$

Equations (1a) and (1b) shown above illustrate a typical matrix-matrix multiplication. A first matrix [A] has two rows and two columns and is referred to in the art as a 2×2 matrix. The first matrix [A] has four elements: $a_{11}$, $a_{12}$, $a_{21}$, and $a_{22}$. A second 2×2 matrix [B] also has four elements: $b_{11}$, $b_{12}$, $b_{21}$, and $b_{22}$. A third 2×2 matrix [C] contains the result of the multiplication of the first matrix [A] and the second matrix [B]. The resulting third 2×2 matrix [C] has four elements: $c_{11}$, $c_{12}$, $c_{21}$, and $c_{22}$. To calculate the value of all the elements in the third 2×2 matrix [C] using the traditional method for matrix-matrix multiplication, equations (2) through (13) shown below are used.

$$s_1 = a_{11}b_{11} \tag{2}$$

$$s_2 = a_{12}b_{21} \tag{3}$$

$$s_3 = a_{11}b_{12} \tag{4}$$

$$s_4 = a_{12}b_{22} \tag{5}$$

$$s_5 = a_{21}b_{11} \tag{6}$$

$$s_6 = a_{22}b_{21} \tag{7}$$

$$s_7 = a_{21}b_{12} \tag{8}$$

$$s_8 = a_{22}b_{22} \tag{9}$$

$$c_{11} = s_1 + s_2 \tag{10}$$

$$c_{12} = s_3 + s_4 \tag{11}$$

$$c_{21} = s_5 + s_6 \tag{12}$$

$$c_{22} = s_7 + s_8 \tag{13}$$

As demonstrated above, multiplying two 2×2 matrices, using the traditional method, requires 8 multiplication operations and 4 addition operations. As the size of the matrices being multiplied becomes larger, the number of multiplication operations and addition operations increases on the order of the cube of the matrix size, denoted $O(n^3)$. Due to the larger computational cost of these operations, a number of methods have been developed to decrease the number of computation steps.

One such method is the Strassen method. The Strassen method recursively divides a matrix into smaller sub-matrices upon which the arithmetic savings of requiring only 7 multiplication operations are applied at each level of recursion. The Strassen method is typically employed for matrices that are greater than 128×128 or larger, depending on the computational resources being used. While the Strassen method typically provides a significant decrease in computation time, the method introduces a precision loss due to an uneven distribution of arithmetic in the result matrix. Thus, while the computation of a matrix multiplication requires fewer computation steps using the Strassen method, the end result may be less precise than would occur using traditional methods. In this context, precision is defined as the number of significant digits to which a value may be reliably measured.

To further reduce computation steps by the Strassen method, many variant methods have been created. The Winograd variant of the Strassen method provides a balanced trade-off between decreased additions and increased memory requirements and complexity.

Equations (14)–(34) illustrate application of the Winograd variant of the Strassen method for matrix-matrix multiplication for the previously defined 2×2 matrices [A] and [B] in equation (1b).

$$s_1 = a_{21} + a_{22} \tag{14}$$

$$s_2 = s_1 - a_{11} \tag{15}$$

$$s_3 = a_{11} - a_{21} \tag{16}$$

$$s_4 = a_{12} - s_2 \tag{17}$$

$$s_5 = b_{12} - b_{11} \tag{18}$$

$$s_6 = b_{22} - s_5 \tag{19}$$

$$s_7 = b_{22} - b_{12} \tag{20}$$

$$s_8 = s_6 - b_{21} \tag{21}$$

$$m_1 = s_2 s_6 \tag{22}$$

$$m_2 = a_{11} b_{11} \tag{23}$$

$$m_3 = a_{12} b_{21} \tag{24}$$

$$m_4 = s_3 s_7 \tag{25}$$

$$m_5 = s_1 s_5 \tag{26}$$

$$m_6 = s_4 b_{22} \tag{27}$$

$$m_7 = a_{22} s_8 \tag{28}$$

$$t_1 = m_1 + m_2 \tag{29}$$

$$t_2 = t_1 + m_4 \tag{30}$$

$$c_{11} = m_2 + m_3 \tag{31}$$

$$c_{12}=t_1+m_5+m_6 \quad (32)$$

$$c_{21}=t_2-m_7 \quad (33)$$

$$c_{22}=t_2+m_5 \quad (34)$$

As demonstrated above, multiplying two 2×2 matrices using the Strassen/Winograd method requires 7 multiplication operations and 15 addition operations. The power of Strassen methods comes from the recursion. The 2×2 matrix elements may themselves be matrices so that a reduction in arithmetic is achieved at each level of recursion. The number of multiplication operations and addition operations increases on an order approaching $Log_2(7)$ of the matrix size, denoted $O(n^{2.8})$. Due to the high computational costs of matrix multiplication operations, a number of methods have been developed to decrease the number of computation steps.

As the dimensions of the matrices being multiplied increases, i.e., an increase in the number of rows and/or columns, the required computation increases exponentially creating a necessity for a recursive computational method to subdivide and more accurately solve for the unknowns. A threshold occurs where the Winograd variation of the Strassen method is more efficient than the traditional matrix-matrix multiplication method is described as a crossover point. Essentially, the Winograd variation of the Strassen method is used recursively to perform the matrix-matrix multiplication until the crossover point is reached. Once the crossover point is reached, the traditional matrix-matrix multiplication method is more efficient than the Winograd variation of the Strassen method.

The precision loss introduced by the Winograd variation of the Strassen method is typically seen in matrix-matrix multiplication using floating point numbers. A floating-point number is a number represented by a mantissa and an exponent according to a given base. The mantissa is usually a value between zero and one. To find the value of a floating-point number, the base is raised to the power of the exponent, and the mantissa is multiplied by the result. Ordinary scientific notation uses floating-point numbers with 10 as the base. In a computer, the base for the floating-point number is usually two. Precession loss typically arises in floating point number calculations through round-off errors. Round-off errors are a result of rounding results of floating-point operations (e.g., multiplication steps in matrix-matrix multiplication) during mathematical calculations.

SUMMARY OF INVENTION

In general, in one aspect, the invention relates to a computer system for multiplying a first matrix and a second matrix that reduces rounding error, comprising a processor, a memory, a storage device, and software instructions stored in the memory for enabling the computer system, under the control of the processor, to perform obtaining a first set of dimension values for the first matrix and a second set of dimension values for the second matrix, selecting one of a plurality of multiplication permutations if the first set of dimension values and the second set of dimension values are greater than a crossover value, multiplying the first matrix by the second matrix using the multiplication permutation and a Strassen-Winograd method, recursively sub-dividing the first matrix and the second matrix producing a set of sub-matrix products and a recursion tree, and propagating the set of sub-matrix products up the recursion tree to produce a product matrix.

In general, in one aspect, the invention relates to a computer-readable medium having recorded thereon instructions executable by a processor, the instructions for obtaining a first set of dimension values for the first matrix and a second set of dimension values for the second matrix, selecting one of a plurality of multiplication permutations if the first set of dimension values and the second set of dimension values are greater than a crossover value, multiplying the first matrix by the second matrix using the multiplication permutation and a Strassen-Winograd method, recursively sub-dividing the first matrix and the second matrix producing a set of sub-matrix products and a recursion tree, and propagating the set of sub-matrix products up the recursion tree to produce a product matrix.

In general, in one aspect, the invention relates to an apparatus for multiplying a first matrix and a second matrix, comprising means for obtaining a first set of dimension values for the first matrix and a second set of dimension values for the second matrix, means for selecting one of a plurality of multiplication permutations if the first set of dimension values and the second set of dimension values are greater than a crossover value, means for multiplying the first matrix by the second matrix using the multiplication permutation and a Strassen-Winograd method, means for recursively sub-dividing the first matrix and the second matrix producing a set of sub-matrix products and a recursion tree, and means for propagating the set of sub-matrix products up the recursion tree to produce a product matrix.

Other aspects and advantages of the invention will be apparent from the following description and the appended claims.

DETAILED DESCRIPTION

In the following detailed description of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

The present invention relates to a method for increasing precision of the result in a matrix-matrix multiplication. Further, the present invention relates to a method of modifying the Strassen/Winograd matrix multiplication method. Further, the present invention relates to a recursive method for implementing matrix-matrix multiplication.

Figure 1:
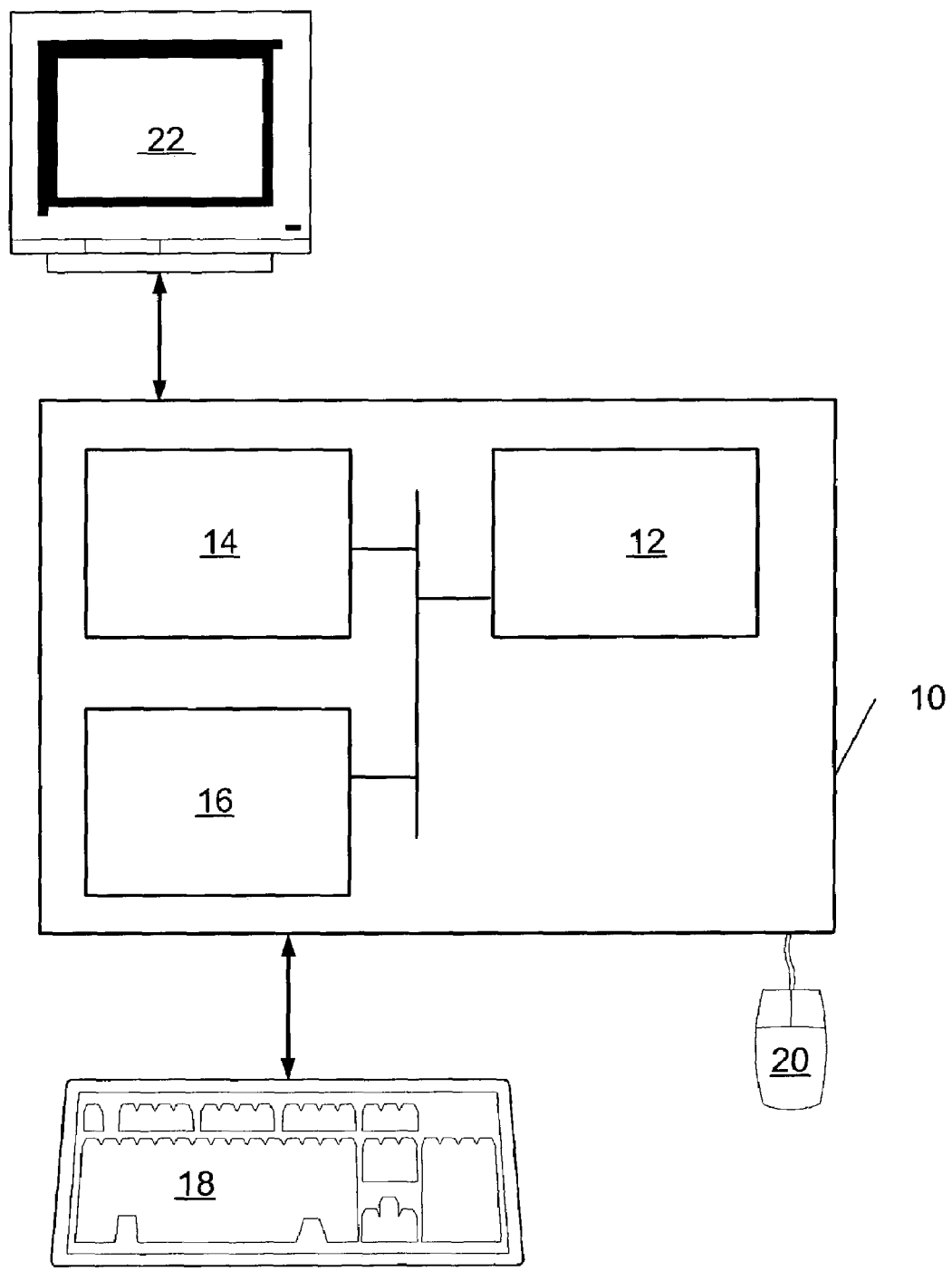
FIG. 1 illustrates a typical computer.

The present invention may be implemented on virtually any type computer regardless of the platform being used. For example, as shown in FIG. 1, a typical computer (10) includes a processor (12), associated memory (14), a storage device (16), and numerous other elements and functionalities typical of today's computers (not shown). The computer (10) may also include input means, such as a keyboard (18) and a mouse (20), and output means, such as a monitor (22). Those skilled in the art will appreciate that these input and output means may take other forms in an accessible environment.

The Strassen/Winograd matrix multiplication method is not symmetric in its arguments. While traditional matrix-matrix multiplication methods apply the same arithmetic operations to each input element, the Strassen method and its variants do not. In the Winograd variation of the Strassen method, the lower right portion of the resulting matrix receives the greatest number of destructive cancellation bits resulting from additions, while the upper left portion receives the least number of destructive cancellation bits. With each recursion of the Winograd variation of the Strassen method, the destructive cancellation is again focused on the lower right portion. Thus, the resulting matrix typically contains elements in the upper left portion that are precise, and elements in the lower right portion that are not as precise. The destructive cancellation may result in removal of the least significant bits. This typically occurs during an addition or subtraction operation.

In one embodiment of the invention, the precision is increased by distributing the destructive cancellation throughout a resulting matrix, instead of allowing the destructive cancellation to accumulate in one portion of the resulting matrix. The present invention distributes the destructive cancellation by using one of eight permutations of the Winograd variation of the Strassen method during each recursive step.

Equations (35) through (42) illustrate eight permutations employed by the invention.

$$\begin{bmatrix} a_{11} & a_{12} \\ a_{21} & a_{22} \end{bmatrix} \begin{bmatrix} b_{11} & b_{12} \\ b_{21} & b_{22} \end{bmatrix} = \begin{bmatrix} c_{11} & c_{12} \\ c_{21} & c_{22} \end{bmatrix} \quad (35)$$

$$\begin{bmatrix} a_{12} & a_{11} \\ a_{22} & a_{21} \end{bmatrix} \begin{bmatrix} b_{21} & b_{22} \\ b_{11} & b_{12} \end{bmatrix} = \begin{bmatrix} c_{11} & c_{12} \\ c_{21} & c_{22} \end{bmatrix} \quad (36)$$

$$\begin{bmatrix} a_{21} & a_{22} \\ a_{11} & a_{12} \end{bmatrix} \begin{bmatrix} b_{11} & b_{12} \\ b_{21} & b_{22} \end{bmatrix} = \begin{bmatrix} c_{21} & c_{22} \\ c_{11} & c_{12} \end{bmatrix} \quad (37)$$

$$\begin{bmatrix} a_{22} & a_{21} \\ a_{12} & a_{11} \end{bmatrix} \begin{bmatrix} b_{21} & b_{22} \\ b_{11} & b_{12} \end{bmatrix} = \begin{bmatrix} c_{21} & c_{22} \\ c_{11} & c_{12} \end{bmatrix} \quad (38)$$

$$\begin{bmatrix} a_{11} & a_{12} \\ a_{21} & a_{22} \end{bmatrix} \begin{bmatrix} b_{12} & b_{11} \\ b_{22} & b_{21} \end{bmatrix} = \begin{bmatrix} c_{21} & c_{11} \\ c_{22} & c_{21} \end{bmatrix} \quad (39)$$

$$\begin{bmatrix} a_{12} & a_{11} \\ a_{22} & a_{21} \end{bmatrix} \begin{bmatrix} b_{22} & b_{21} \\ b_{12} & b_{11} \end{bmatrix} = \begin{bmatrix} c_{12} & c_{11} \\ c_{22} & c_{21} \end{bmatrix} \quad (40)$$

$$\begin{bmatrix} a_{21} & a_{22} \\ a_{11} & a_{12} \end{bmatrix} \begin{bmatrix} b_{22} & b_{21} \\ b_{22} & b_{21} \end{bmatrix} = \begin{bmatrix} c_{22} & c_{21} \\ c_{22} & c_{21} \end{bmatrix} \quad (41)$$

$$\begin{bmatrix} a_{22} & a_{21} \\ a_{12} & a_{11} \end{bmatrix} \begin{bmatrix} b_{22} & b_{21} \\ b_{12} & b_{11} \end{bmatrix} = \begin{bmatrix} c_{22} & c_{21} \\ c_{12} & c_{11} \end{bmatrix} \quad (42)$$

It is important to note that the indexed elements used in the permutations correspond to placement of values within the matrix and not to the variables denoted in equations (14)–(34). By using the eight permutations in conjunction with the Winograd variation of the Strassen method, the destructive cancellation is evenly distributed to all portions of the resulting matrix.

Figure 2:
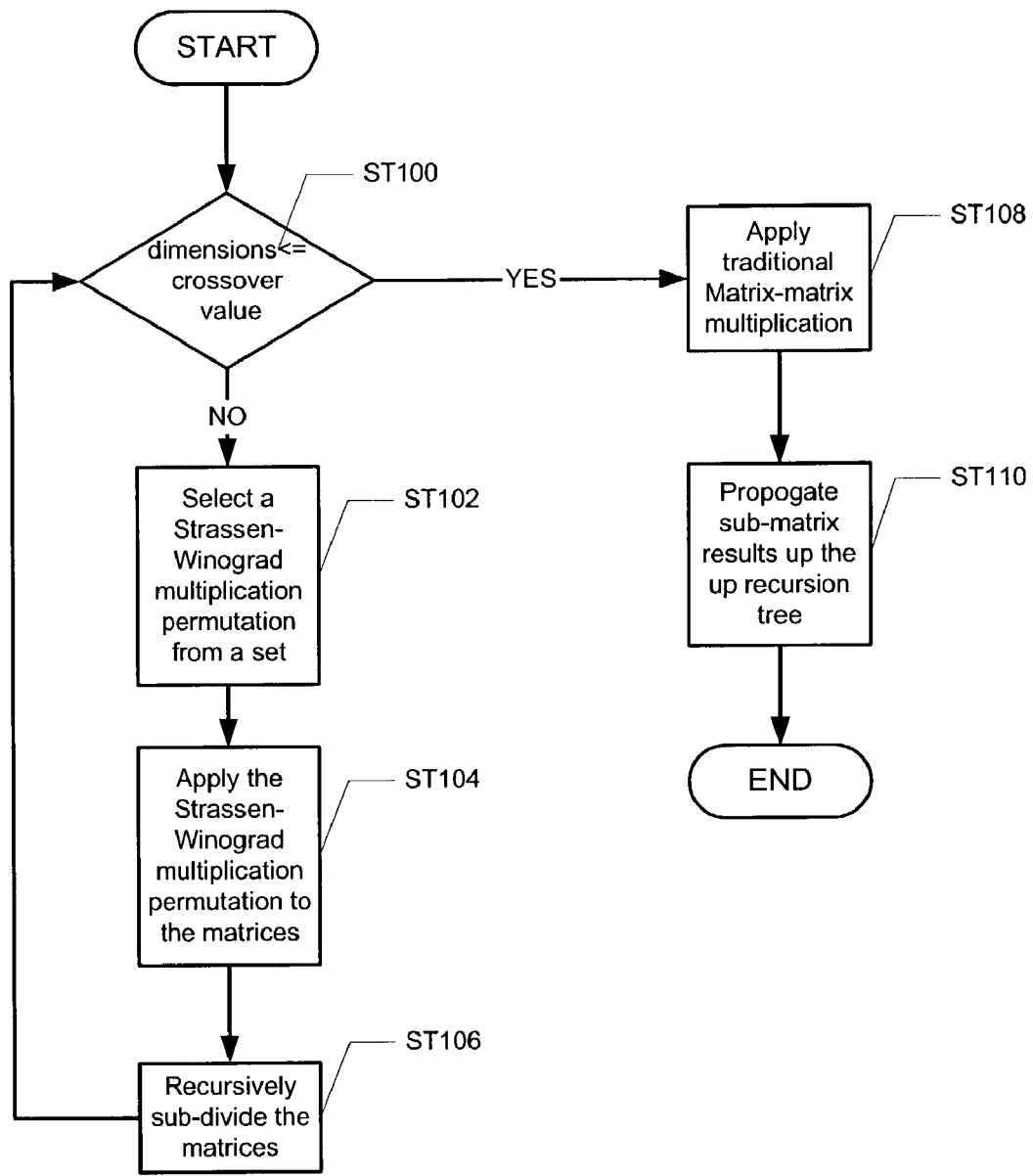
FIG. 2 illustrates a flow chart in accordance with one embodiment of the present invention.

FIG. 2 illustrates a flow chart in accordance with one embodiment of the present invention. The value of the dimensions of a first matrix and a second matrix, i.e., number of rows and number of columns, are compared to a crossover value (Step 100). The crossover value is defined as the value below which using the Winograd variation of the Strassen method is less efficient than using traditional matrix-matrix multiplication methods. In one embodiment of the invention, the crossover value is determined by experiment.

Figure 3:
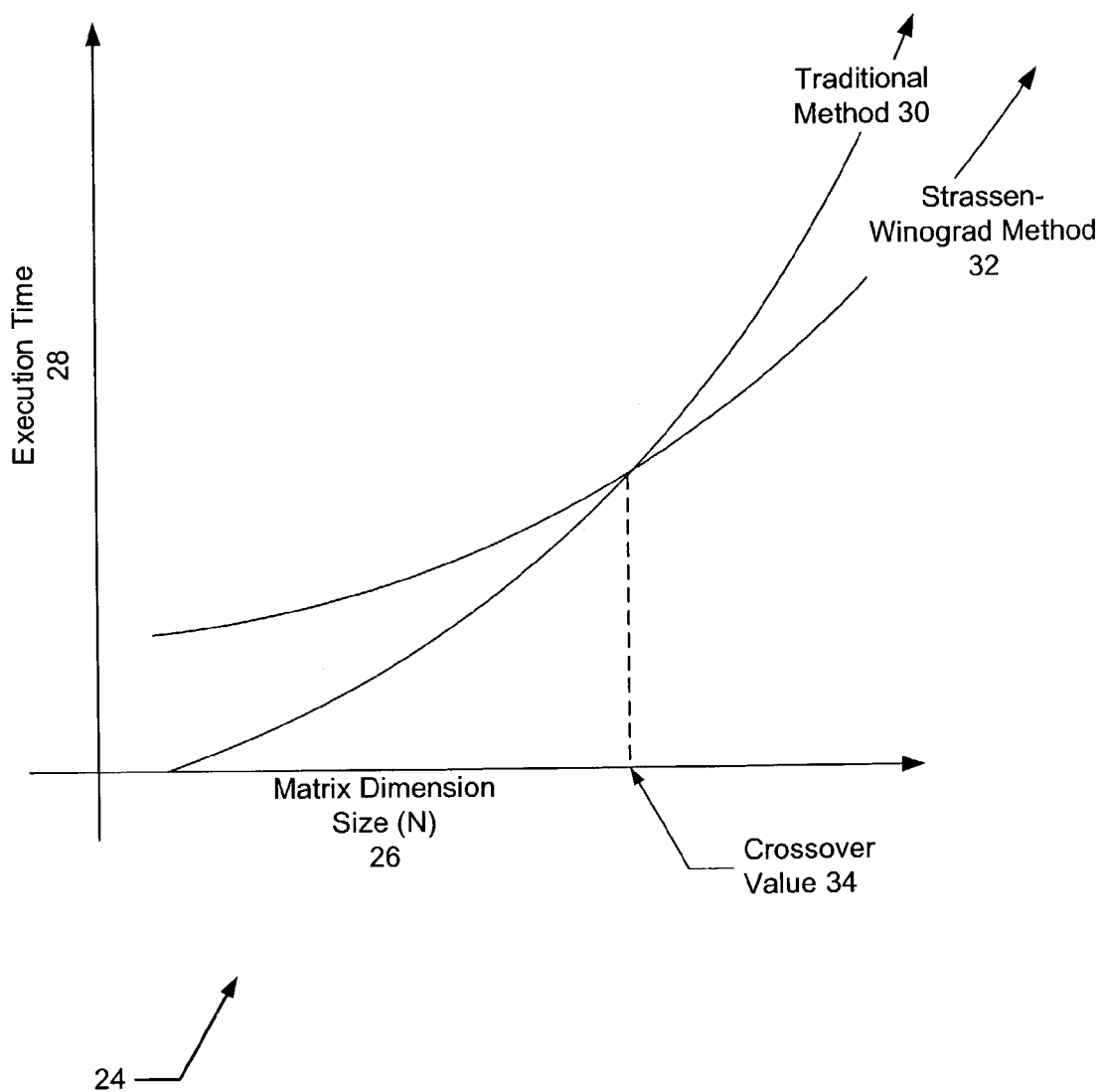
FIG. 3 illustrates a plot of experimental data to determine a crossover value in accordance with one embodiment of the invention.

FIG. 3 illustrates a plot of experimental data to determine a crossover in accordance with one embodiment of the invention. Experimental data is plotted on a graph (24). The graph (24) denotes matrix dimension size (26) along the x-axis and execution time (28) along the Y-axis. Two sets of experimental data are plotted on the graph (24), traditional method (30) and Strassen-Winograd method (32). The Strassen-Winograd method (32) plot is determined using the present invention. A crossover value (34) is the matrix dimension size (26) corresponding to the point at which the plot for the traditional method (30) and the plot for the Strassen-Winograd method (32) intersect. The crossover value (34) is typically determined for each computer system configuration.

Returning to FIG. 2, if the dimensions of the first matrix and the second matrix are above the crossover value, then a Strassen-Winograd multiplication permutation, e.g., one of the multiplication permutations denoted in equations (35)–(42), is selected from a set (Step 102). In one embodiment of the invention, the Strassen-Winograd multiplication permutation is randomly selected from the set. In another embodiment of the invention, the Strassen-Winograd multiplication permutation is selected from the set using a round-robin method.

Alternatively, the Strassen-Winograd multiplication permutation is selected using a pre-determined order heuristic based on the data in the first matrix and data in the second matrix. For example, the pre-determined order heuristic may select a particular order of the Strassen-Winograd multiplication permutations when the first matrix and the second matrix are diagonally dominant matrices (i.e., where the diagonal element is greater than the sum of all off-diagonal elements). Thus, the invention may be optimized for particular types of matrices.

The selected multiplication permutation is then applied to the first matrix and the second matrix (Step 104). The resulting matrix is then recursively sub-divided (Step 106). In one embodiment, the first matrix and the second matrix are recursively sub-divided by a factor of 2. Prior to the first matrix and the second matrix being sub-divided, there is a check to determine if all dimensions of the first matrix and second matrix are even. For all dimensions of the first matrix and the second matrix that are not even, a set of 0's are added to the row and/or column to make the particular dimension even. For example, if the first matrix was a 3×4 matrix, then a row of 0's will be added to the first matrix to make the first matrix a 4×4 matrix. Meanwhile, a recursion tree is created to track the recursive sub-divisions as the first matrix and the second matrix are sub-divided. Steps 100 through 106 are repeated until the dimensions of the first matrix and the second matrix are sufficiently reduced to a value equal to or below the crossover value (Step 100).

When the value of the dimensions of the first matrix and the second matrix are equal to or below the crossover value, the recursive sub-divisions of the first and second matrix are multiplied using a traditional matrix-matrix multiplication method (Step 108). The results of the traditional matrix-matrix multiplication signal that the crossover point in the recursion has occurred. This results in sub-matrix products that can be propagated up the recursion tree with the final result being the product of the first matrix and the second matrix (Step 110).

In one embodiment of the present invention, a processor using interval arithmetic is used to perform the matrix-matrix multiplication described above.

Figure 4:
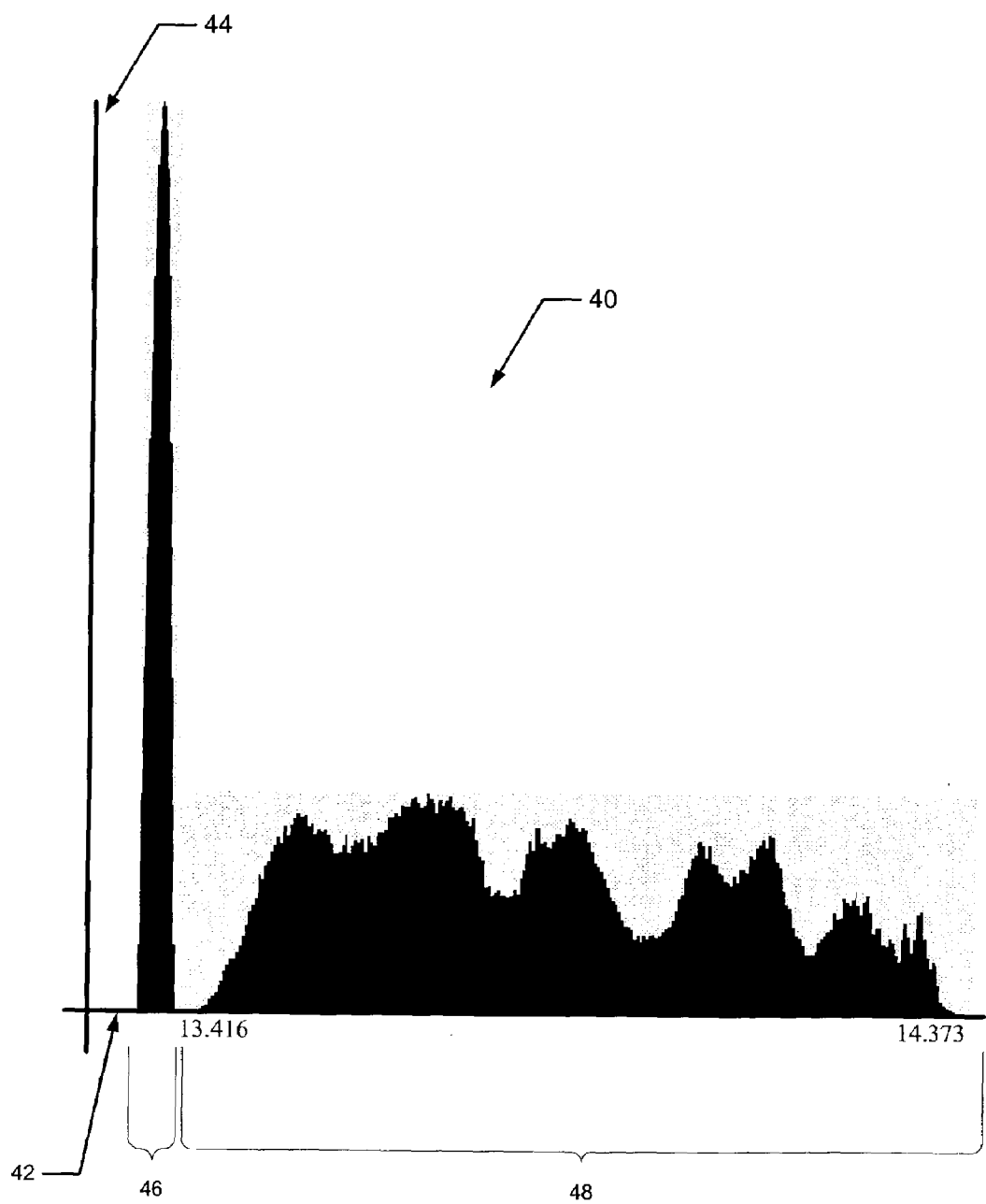
FIG. 4 illustrates a distribution plot of experimental data in accordance with one embodiment of the invention.

FIG. 4 illustrates a distribution plot of experimental data in accordance with one embodiment of the invention. The distribution plot (40) is a histogram with approximate decimal digits of accuracy along the x-axis (42) and number of elements in the result matrix with the corresponding approximate decimal digits of accuracy (i.e., relative precision) (44) along the Y-axis. The result of plotting the aforementioned variables produces a distribution of approximate decimal digits of accuracy (i.e., relative precision) across an entire result matrix. A first portion (46) of the plot (40) corresponds to a distribution of approximate decimal digits of accuracy that occur in a result matrix using traditional matrix-matrix multiplication. A second portion (48) of the plot (40) corresponds to a distribution of approximate decimal digits of accuracy that occur in a result matrix using one embodiment of the present invention. In this particular example, the approximate decimal digits of accuracy for all elements in the result matrix using one embodiment of the present invention is greater than the approximate decimal digits of accuracy for all elements in the result matrix using traditional matrix-matrix multiplication.

Advantages of the present invention may include one or more of the following. The invention computes the product of two matrices more efficiently than traditional matrix-matrix multiplication methods. Further, the invention produces more precise results than the Strassen method and its variants. Further, the invention reduces round-off error caused by the destructive cancellation of significant bits. Further, the invention distributes precision loss across the entire resulting matrix during a matrix-matrix multiplication. Those skilled in the art will appreciate that the present invention may have further advantages.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer system comprising:
    a processor configured to execute an operation on a first matrix and a second matrix, wherein the operation causes round-off errors by destructively cancelling at least one significant bit;
    a memory;
    a storage device; and
    software instructions stored in the memory for enabling the computer system, under the control of the processor, to produce and store a product matrix by:
        obtaining a first set of dimension values for the first matrix and a second set of dimension values for the second matrix,
        selecting one of a plurality of multiplication permutations if the first set of dimension values and the second set of dimension values are greater than a crossover value, wherein selecting from a plurality of multiplication permutations uses a round-robin method,
        multiplying the first matrix by the second matrix using the multiplication permutation, a Strassen-Winograd method, and the operation,
        recursively sub-dividing the first matrix and the second matrix producing a set of sub-matrix products and a recursion tree,
        propagating the set of sub-matrix products up the recursion tree to produce the product matrix, and
        storing the product matrix in the memory to obtain a stored product matrix,
    wherein executing the software instructions reduces round-off errors by distributing destructive cancellation of the at least one significant bit by the operation across the stored product matrix.

2. The system of claim 1, further comprising instructions for:
    multiplying the first matrix and the second matrix using a traditional matrix multiplication if the first set of dimension values and the second set of dimension values are less than or equal to the crossover value.

3. The system of claim 1, further comprising instructions for:
    padding a dimension in the first set of dimensions or the second set of dimensions if the dimension is not even before sub-dividing the first matrix and the second matrix.

4. The system of claim 3, wherein the padding uses a plurality of zero digits.

5. The system of claim 1, wherein recursively sub-dividing the first matrix and the second matrix is by a factor of two.

6. The system of claim 1, wherein propagating up the recursion tree occurs after the first set of dimension values and the second set of dimension values are less than or equal to the crossover value.

7. The system of claim 1, wherein selecting from a plurality of multiplication permutations is random.

8. The system of claim 1, wherein the crossover value is determined by experimentation.

9. A computer-readable medium having recorded thereon instructions executable by a processor in a computer system, wherein the processor is configured to execute an operation on a first matrix and a second matrix, the instructions for:
    obtaining a first set of dimension values for the first matrix and a second set of dimension values for the second matrix;
    selecting one of a plurality of multiplication permutations if the first set of dimension values and the second set of dimension values are greater than a crossover value, wherein selecting from a plurality of multiplication permutations uses a round-robin method;
    multiplying the first matrix by the second matrix using the multiplication permutation, a Strassen-Winograd method, and the operation;
    recursively sub-dividing the first matrix and the second matrix producing a set of sub-matrix products and a recursion tree;
    propagating the set of sub-matrix products up the recursion tree to produce a product matrix; and
    storing the product matrix in a memory of the computer system to obtain a stored product matrix,
    wherein the operation causes round-off errors by destructively cancelling at least one significant bit, and
    wherein executing the instructions reduces round-off errors by distributing destructive cancellation of the at least one significant bit by the operation across the stored product matrix.

10. A computer system comprising:
- a processor configured to execute an operation on a first matrix and a second matrix, wherein the operation causes round-off errors by destructively cancelling at least one significant bit;
- a memory;
- a storage device; and
- software instructions stored in the memory for enabling the computer system, under the
  - control of the processor, to produce and store a product matrix by:
    - obtaining a first set of dimension values for the first matrix and a second set of dimension values for the second matrix,
    - selecting one of a plurality of multiplication permutations if the first set of dimension values and the second set of dimension values are greater than a crossover value, wherein selecting from a plurality of multiplication permutations uses a pre-determined order heuristic based on data in the first matrix and data in the second matrix,
    - multiplying the first matrix by the second matrix using the multiplication permutation a Strassen-Winograd method, and the operation,
    - recursively sub-dividing the first matrix and the second matrix producing a set of sub-matrix products and a recursion tree,
    - propagating the set of sub-matrix products up the recursion tree to produce the product matrix, and
    - storing the product matrix in the memory to obtain a stored product matrix,
- wherein executing the software instructions reduces round-off errors by distributing destructive cancellation of the at least one significant bit by the operation across the stored product matrix.

11. A computer-readable medium having recorded thereon instructions executable by a processor in a computer system, wherein the processor is configured to execute an operation on a first matrix and a second matrix, the instructions for:
- obtaining a first set of dimension values for the first matrix and a second set of dimension values for the second matrix;
- selecting one of a plurality of multiplication permutations if the first set of dimension values and the second set of dimension values are greater than a crossover value, wherein selecting from a plurality of multiplication permutations uses a pre-determined order heuristic based on data in the first matrix and data in the second matrix;
- multiplying the first matrix by the second matrix using the multiplication permutation, a Strassen-Winograd method, and the operation;
- recursively sub-dividing the first matrix and the second matrix producing a set of sub-matrix products and a recursion tree;
- propagating the set of sub-matrix products up the recursion tree to produce a product matrix; and
- storing the product matrix in a memory of the computer system to obtain a stored product matrix,
- wherein the operation causes round-off errors by destructively cancelling at least one significant bit, and
- wherein executing the instructions reduces round-off errors by distributing destructive cancellation of the at least one significant bit by the operation across the stored product matrix.

* * * * *